United States Patent [19]
Scheurenbrand et al.

[11] Patent Number: 4,842,006
[45] Date of Patent: Jun. 27, 1989

[54] DASHPOT FOR FUEL TANKS

[75] Inventors: Dieter Scheurenbrand, Wolfschlugen; Helmut Wawra, Korb; Wolfgang Kleineberg, Altbach, all of Fed. Rep. of Germany

[73] Assignee: Daimler-Benz Aktiengesellschaft, Stuttgart, Fed. Rep. of Germany

[21] Appl. No.: 206,122

[22] Filed: Jun. 13, 1988

[30] Foreign Application Priority Data

Jun. 13, 1987 [DE] Fed. Rep. of Germany ....... 3719808

[51] Int. Cl.[4] ............................................. F02M 37/20
[52] U.S. Cl. .................................... 137/202; 137/574; 137/576; 123/514; 123/516
[58] Field of Search ............... 137/202, 571, 572, 574, 137/576; 123/514, 516

[56] References Cited

U.S. PATENT DOCUMENTS

| | | | |
|---|---|---|---|
| 2,252,687 | 8/1941 | Bassett | 137/202 |
| 3,020,950 | 2/1962 | Schraivogel | 137/574 X |
| 3,049,171 | 8/1962 | Neuerburg et al. | 137/574 X |
| 3,703,165 | 11/1972 | Hansen | 137/202 X |
| 3,726,370 | 4/1973 | Coscia | 137/576 |
| 4,279,232 | 7/1981 | Schuster et al. | 123/516 |
| 4,397,333 | 8/1983 | Liba et al. | 137/576 X |
| 4,416,303 | 11/1983 | Scheurenbrand | 137/576 |
| 4,503,885 | 3/1985 | Hall | 137/576 X |
| 4,546,750 | 10/1985 | Brunell et al. | 137/571 X |
| 4,672,937 | 6/1987 | Fales et al. | 123/516 X |

FOREIGN PATENT DOCUMENTS 2401728 12/1983 Fed. Rep. of Germany.

*Primary Examiner*—John Rivell
*Attorney, Agent, or Firm*—Barnes & Thornburg

[57] ABSTRACT

A dashpot for fuel tanks is designed such that gas bubbles produced in the latter can no longer cause troublesome noises within the fuel tank. This is achieved by means of a gas separation space which is separated from the dashpot intake chamber, into which a fuel return line opens and to the upper wall of which a degassing line discharging above the maxiumum fuel level in the fuel tank is connected.

10 Claims, 3 Drawing Sheets

DASHPOT FOR FUEL TANKS

BACKGROUND AND SUMMARY OF THE INVENTION

The invention relates to a dashpot for the fuel tanks having an upper wall which closes off, at the top, a gas separation space which has lateral wall parts and a lower fuel guide surface and is connected to an opening above the maximum fuel level provided therein, to which gas separation space returning fuel can be fed via a fuel return line, and having a pot opening near the base, via which opening fuel can be drawn off into the pot interior from the supply of fuel present in the fuel tank by means of an ejector jet generated by returning fuel by means of an injector nozzle.

A dashpot of this kind is disclosed in DE-PS No. 2,401,728. In this design, the pot opening, which is near the base and arranged downstream of the injector nozzle, is located at an end of the gas separation space, said end being accessible from the outside of the pot, which gas separation space opens with its other end into the pot interior. The opening is located in the center of the upper wall of the pot which closes off both the pot interior and the gas separation space.

The fuel which is not consumed in supplying internal combustion engines with fuel, in particular those having fuel injection, is usually heated, in particular on its return journey along hot zones, giving rise to gas bubbles in the fuel line. When the ejector jet formed by this fuel enters the gas separation space, the gas bubbles expand, float upwards and are carried along by the current into the pot interior. They escape from this via the central opening in the upper wall of the pot and pass into the fuel tank.

Now, in so far as the level of the fuel in the fuel tank is substantially above the height of the dashpot, the gas bubbles make their way upwards in the fuel, this being associated with more or less pronounced bubbling noises which can be heard in the passenger compartment and are therefore troublesome.

It is thus an object of the present invention to improve a dashpot of a design referred to above such that gas bubbles can no longer cause troublesome noises within the fuel tank. This object is achieved in preferred embodiments of the invention by providing that the gas separation space is separated from the pot interior and by providing a degassing line leading away from the gas separation space and discharging above the maximum fuel level into the fuel tank.

In a dashpot of this kind, returning fuel can become calmer and lose its gas while it flows along the fuel guide surface, the gas being caught in the gas separation space and discharged silently via the degassing line into the upper, fuel-free part of the fuel tank.

Even given a relatively high flow rate of the returning fuel within the gas separation space, certain preferred embodiments include a gas bubble retaining device to assure satisfactory degassing.

The calming of the fuel for the purpose of degassing in the gas separation space is favored in certain preferred embodiments by configuring the gas separation space cross-section to increase in the direction of the flow of the fuel. Preferred embodiments offer the advantage that an adequate suction effect for drawing in fuel from the fuel tank can still be achieved by means of the returning fuel even where the degassing section is relatively long by sloping the fuel guide surface downwardly in the direction of the injector nozzle and by disposing the injector nozzle to connect to the gas separation space behind the lower end of the inclined surface.

In certain preferred embodiments it is possible to equip the dashpot with a relatively long degassing section while employing a particularly compact design of the dashpot by forming the dashpot of essentially circular cylindrical shape and extending the gas separation space along the outside of the pot wall.

Other objects, advantages and novel features of the present invention will become apparent from the following detailed description of the invention when considered in conjunction with the accompanying drawings.

DETAILED DESCRIPTION OF THE INVENTION

Figure 1:
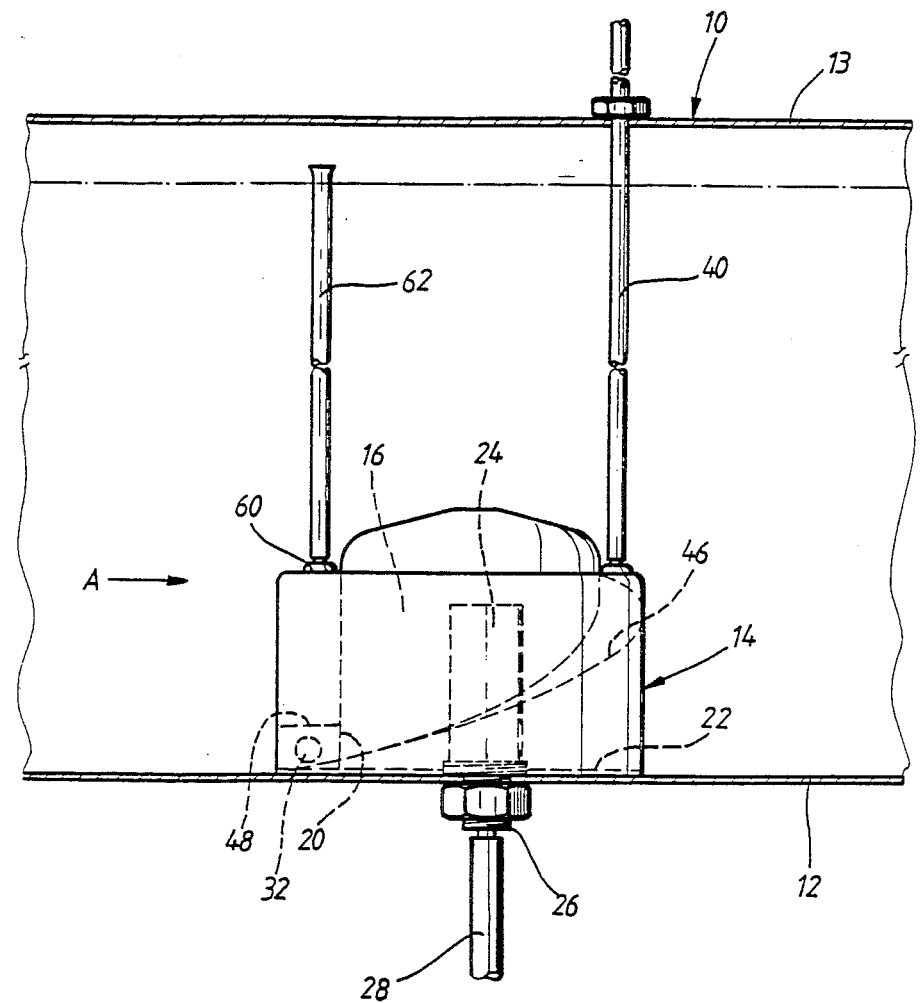
FIG. 1 is a longitudinal sectional view of a fuel tank fitted with a dashpot constructed according to a preferred embodiment of the invention, shown foreshortened in height and length.

In FIG. 1, a fuel tank of a vehicle driven by means of an internal combustion engine having fuel injection is designated as a whole by 10. A dashpot 14 is located on the base 12 of the fuel tank 10. Fuel is continuously withdrawn from the pot interior 16 of dashpot 1, referred to below as intake chamber during the operation of the internal combustion engine. The intake chamber 16 has a central opening 18 at the top, a chamber wall 20 and a pot base 22, in the center of which suction filter 24 protruding from below into the intake chamber 16 is located. It is also contemplated for a suction filter to be passed through the upper, central opening 18 and for the pot base 22 to be of closed design.

The suction filter 24 passes through the base 12 of the fuel tank 10 by a collecting nipple 26 to which an intake hose 28 leading to a fuel injection pump is connected.

The intake chamber 16 is filled continuously with fuel. If there is enough fuel in the fuel tank 10, the intake chamber 16 fills up automatically via its upper, central opening 18. However, to ensure that the intake chamber 16 always remains full, even when the fuel tank 10 contains only a little fuel, the dashpot 14 is fitted with a jet pump 30 by means of which fuel is continuously withdrawn from the base region of the fuel tank 10 during the operation of the internal combustion engine and fed to the intake chamber. This jet pump 30 is located in the region of the pot base 22 on the outside of the chamber wall 20 and is formed by an injector nozzle 32 and, adjoining the latter, a channel 34 which widens approximately in the form of a trumpet in the conveying direction. Channel 34 extends along an outer part of the periphery of the chamber wall 20, which ends at 36 and, together with a further chamber wall 38 essentially concentric to chamber wall 20, encloses the intake chamber 16.

The jet pump 30 is operated by means of fuel which is not required for operating the internal combustion engine. This excess fuel is fed to the injector nozzle 32 of the dashpot 24 via a fuel return line 40 which preferably passes through the upper wall 13 of the fuel tank 10. The stream of fuel exiting from the nozzle 32 and directed into the rear end of the channel 34 generates a partial vacuum in the vicinity of the injector nozzle 32 and entrains fuel which is present in the fuel tank 10 into the channel 34 and feeds it to the intake chamber 16.

Figure 2:
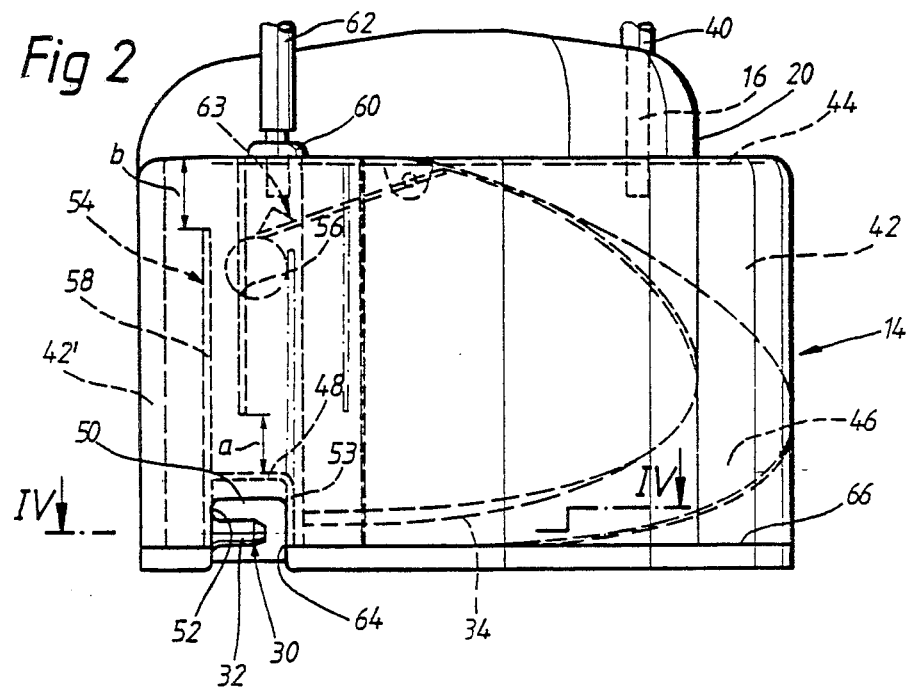
FIG. 2 is a view of the dashpot in the direction of arrow A in FIG. 1.
Figure 3:
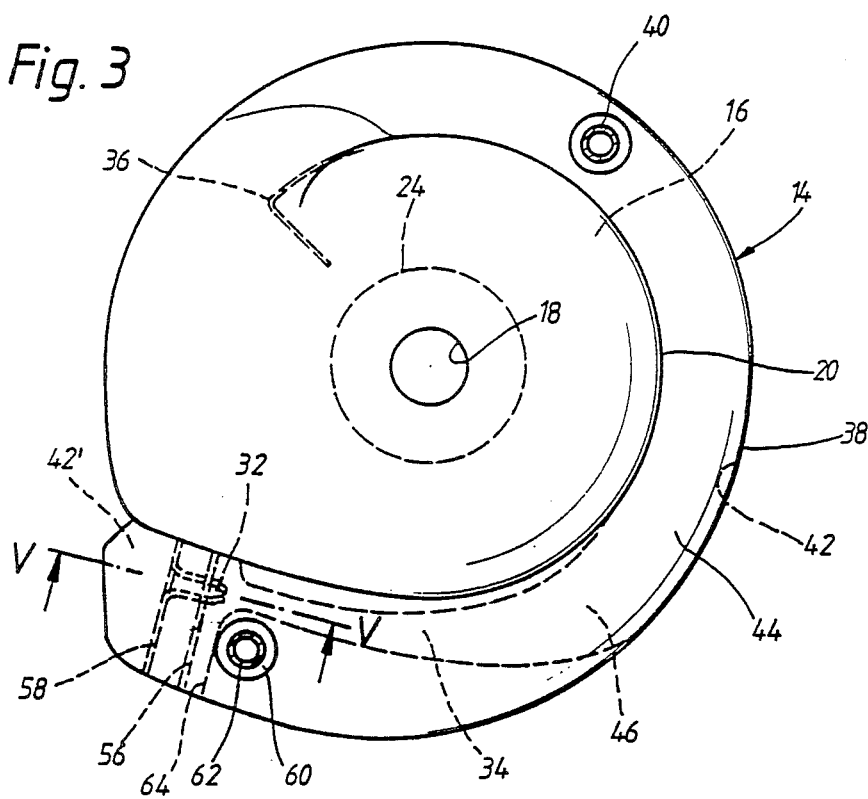
FIG. 3 is a plan view of the dashpot of FIG. 1 and 2.

In this arrangement, the excess fuel first of all passes via a fuel return line 40 into a gas separation space 42 which is delimited by the two lateral chamber walls 20, 38, by an upper wall 44 and by a fuel guide surface which forms the base of the space and is preferably formed by an inclined surface 46 (see FIG. 2).

As the drawing shows, the inclined surface 46 follows a helical course between the direction of the two chamber walls 20, 38 and slopes downwards in the direction of the injector nozzle 32. In the region of the latter, the inclined surface 46 forms a step 48 which extends transverse to the direction of flow to the excess fuel flowing down over it and forms beneath itself a space 50 which opens at the side of the dashpot 14 into the fuel tank 10 and into which the injector nozzle 32 extends.

Figure 4:
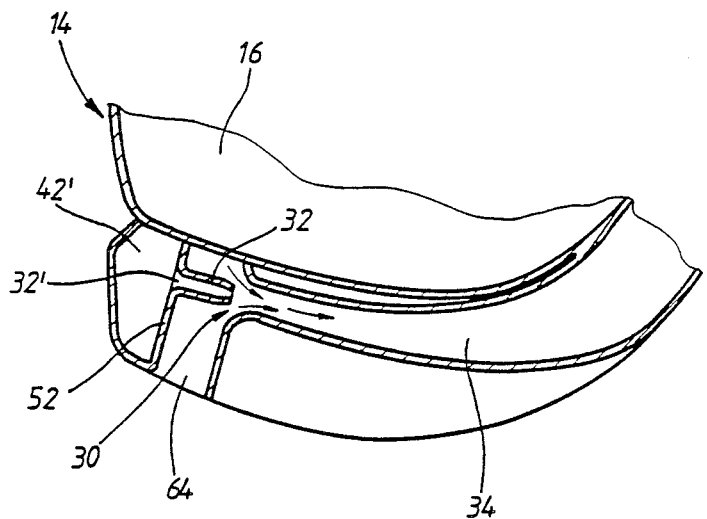
FIG. 4 is a partial sectional view along line IV—IV in FIG. 2.
Figure 5:
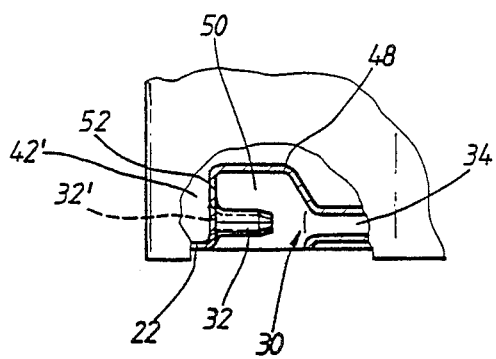
FIG. 5 is a partial sectional view along line V—V in FIG. 3.

As seen in the direction of flow of the jet pump 30, the injector nozzle 32 passes through the rear step wall 52, which merges into the pot base 22, and is held in said step wall (Fig.4). The gas separation space 42 thus extends to behind the step wall 52 so that the rear end 32' of the injector nozzle 32, said rear end having the inlet opening, is located within the gas separation space 42.

As can be seen from FIG. 2, there is preferably furthermore within the gas separation space 42 and above and in the region of the step 48 a gas bubble retaining device, designated as a whole by 54. In the present case, it is preferably formed by at least two upright fuel guide walls 56 and 58 which are arranged one behind the other at an interval and approximately parallel to one another in the direction of flow of the excess fuel and divide off the gas separation space 42 transverse to the direction of flow of the fuel. Of these guide walls, the wall 56 which starts from the upper wall 44 ends at an interval a above the step 48 and the wall 56 which extends upwards from the step 48 ends at an interval b below the upper wall 44 of the gas separation space 42. The gas bubble retaining device 54 could also be provided in another design according to other contemplated embodiments, for example in the manner of a fine-mesh screen.

A connecting branch 60 is arranged in the upper wall 44, for a degassing line 62, said connecting branch preferably being placed immediately upstream of the gas bubble retaining device 54. In accordance with FIG. 1, degassing line 62 is passed upwards in a suitable manner within the fuel tank 10 and opens into an upper tank region which is free from fuel when the fuel tank 10 is filled to the maximum.

As FIG. 2 shows, the cross-section of the gas separation space 42 increases in the direction of flow of the returning fuel, thereby reducing the flow velocity of the latter to a minimum in the direction of the step 48 by reason of an increasing frictional resistance. This favors degassing of the hot fuel flowing into this space via the fuel return line 40 and permeated by gas bubbles formed by vaporized fuel, said degassing taking place in the gas separation space 42. The guiding of the fuel along the outer periphery of the chamber wall 20 and the arrangement of the connection point of the fuel return line 40 on the gas separation space 42 diametrically to the connection point of the degassing line 62 and the equipping of said gas separation space with the gas bubble retaining device 54 makes it possible, while making the dashpot 14 of compact design, to design the degassing section to be correspondingly long and thereby achieve intensive fuel degassing. In this arrangement, the gas collects in the upper region of the gas separation space 42 and can flow off via the degassing line 62 into the upper part of the fuel tank 10, where there is no fuel.

In this arrangement, before the degassed fuel is led upwards between the two fuel guide walls 56 and 58, and subsequently flows downwards again in that part 42' of the gas separation space 42 which has the greatest height, the fuel is made turbulent as soon as it hits the front step wall 53, thereby causing even the smallest gas bubbles still present in the fuel to be separated from the latter and enabling them to float upwards along that side of the fuel guide wall 56 which faces the inclined surface 46.

The fuel flowing into part 42' of the gas separation space 42 flows through the injector nozzle 32, the stream of fuel leaving the latter and directed into the channel 34 entraining fuel is present in the fuel tank 10 via a lateral opening 64 (FIG. 4) of the space 50 below the step 48, passes it to the intake chamber 16 and thereby keeps the latter constantly filled to the maximum.

As can be seen particularly from FIGS. 2 and 4, the fuel jet from the injector nozzle 32 is in certain areas preferably directed along the inclined surface 46 against the direction of flow of the fuel and the channel 34 of the jet pump 30, said channel opening in the shape of a trumpet in the direction of flow, extends below the inclined surface 46. The chamber walls 20, 38 and the pot base 22 and the base of the gas separation space 42, said base forming the inclined surface 46, thus preferably also form, over certain areas, wall parts of the channel 34. It is thereby possible to optimize even further the desired compact design of the dimensions of the dashpot.

Inside the gas separation space 42, a float valve 63 is in addition preferably allocated to the connecting branch 60 of the degassing line 62, said float valve preventing fuel from flowing off via the degassing line 62 in the event of large returning quantities of excess fuel or in the event that the gas separation space 42 is filled to the maximum, and preventing this leakage quantity from reducing the efficiency of the jet pump 30.

The dashpot 14 is preferably of a design such that it can be produced economically as a moulding from a suitable plastic by the injection method. To this end, the dashpot 14 can be produced by, for example, three injection operations capable of being carried out separately, whereupon all that remains is to assemble the three resulting parts in an appropriate manner. In the present case, the pot base 22 for this purpose forms one moulding and the remaining upper part of the dashpot 14 forms the two other mouldings. The lower parting line of the two mouldings is designated in FIG. 2 by 66.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Dashpot for fuel tanks, having an upper wall which closes off the dashpot at a top area thereof, a gas separation space which has lateral wall parts and a lower fuel guide surface which is connected to a vent outlet opening above a maximum fuel level provided in the fuel tank, fuel means for returning fuel having gas bubbles therein to said gas separation space via a fuel return line, said dashpot having an inlet opening near a base wall thereof and via which fuel can be drawn off into a dashpot interior from a supply of fuel present in the fuel tank for degassing thereof in said pot interior and subsequent discharge from the pot interior, an injector nozzle utilizing the returning fuel to generate an ejector jet for drawing off the fuel from the fuel tank into the dashpot interior through the inlet opening, wherein the gas separation space is separated from the dashpot interior and wherein a degassing line means leads away from the gas separation space for discharging bubbles in the returning fuel into the fuel tank through the vent outlet opening at a point above the maximum fuel level of the fuel in the tank, said degassing line means being connected to a vent inlet opening provided in an upper wall of the dashpot interior, and wherein the injector nozzle is connected to the gas separation space for providing the returning fuel for the ejector jet.

2. Dashpot according to claim 1, wherein a gas bubble retaining device is arranged in front of the injector nozzle in the gas separation space.

3. Dashpot according to claim 1, wherein the the gas separation space has a cross-section area which increases in the direction of flow of the returning fuel.

4. Dashpot according to claim 3, wherein a gas bubble retaining device is arranged in front of the injector nozzle in the gas separation space.

5. Dashpot according to claim 1, wherein the gas separation space has a fuel guide surface designed as an inclined surface sloping downwards in a direction towards the injector nozzle.

6. Dashpot according to claim 5, wherein the injector nozzle is connected to the gas separation space at some distance behind a lower end of the inclined surface.

7. Dashpot according to claim 6 wherein a gas bubble retaining device is arranged in front of the injector nozzle in the gas separation space.

8. Dashpot according to claim 7, wherein the dashpot is essentially of circular cylindrical shape, and wherein the gas separation space extends along and outside a dashpot wall part.

9. Dashpot according to claim 1, wherein the dashpot is essentially of circular cylindrical shape, and wherein the gas separation space extends along and outside of a dashpot wall part.

10. Dashpot according to claim 1, wherein a float valve means is arranged inside the gas separation space for closing the vent inlet of the degassing line means whenever fuel in the dashpot reaches a full fuel level.

* * * * *